United States Patent
Aiken et al.

(10) Patent No.: US 6,304,214 B1
(45) Date of Patent: Oct. 16, 2001

(54) ANTENNA ARRAY SYSTEM HAVING COHERENT AND NONCOHERENT RECEPTION CHARACTERISTICS

(75) Inventors: Richard Thomas Aiken, Convent Station; Roger David Benning, Long Valley; Max Aaron Solondz, Morris Township; Norman Gerard Ziesse, Chester, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/306,783

(22) Filed: May 7, 1999

(51) Int. Cl.[7] ....................................................... H01Q 3/30
(52) U.S. Cl. .......................... 342/362; 342/361; 342/368; 342/371; 342/373; 342/378

(58) Field of Search ................................... 342/361–368, 342/377–384, 13–20, 371, 373

(56) References Cited

U.S. PATENT DOCUMENTS

| 4,882,588 | 11/1989 | Renshaw et al. |
|---|---|---|
| 5,481,570 | 1/1996 | Winters . |
| 5,539,407 | * 7/1996 | Scholz ................................... 342/17 |
| 5,675,285 | 10/1997 | Winters . |
| 5,819,168 | 10/1998 | Golden et al. . |

* cited by examiner

Primary Examiner—Bernarr E. Gregory

(57) ABSTRACT

An antenna array system includes a first array for operating in a transmit mode and a receive mode and a second array spaced apart for operating in the receive mode. A receiver adjusts a receive radiation pattern in the receive mode and provides a control signal for a transmit radiation pattern of the transmit mode.

52 Claims, 9 Drawing Sheets

ANTENNA ARRAY SYSTEM HAVING COHERENT AND NONCOHERENT RECEPTION CHARACTERISTICS

FIELD OF INVENTION

This invention relates generally to an antenna array system for use in a wireless communications system.

BACKGROUND

Certain conventional antenna systems that adapt radiation patterns to meet conditions in a wireless communication system are referred to as "smart antennas" or "adaptive antenna arrays". Typically, an adaptive antenna array uses a group of receivers to determine a suitable radiation pattern that maximizes the received signal strength of an uplink transmission. If multiple receivers are mounted with the antenna system on a tower-top, replacement and repair of the antenna system becomes difficult and costly. Further, many conventional adaptive antennas only provide increased uplink receiver performance without any corresponding benefit for downlink transmission. Thus, a need exists for a reliable antenna system that provides enhanced performance for both uplink and downlink signals in a wireless communications system.

Conventional adaptive arrays for uplink reception may be used in conjunction with a separate switched, fixed beam system for downlink transmission. For example, certain antenna systems use a "sub-sectored" approach for uplink reception as a mechanism for making the correct switching choice for a related downlink transmission. However, using multiple antenna arrays may exceed the limits of available mounting space. Moreover, using multiple antennas may increase transmission line, duplexer, cable, and other hardware requirements.

To simplify antenna design, some adaptive reception antennas balance their reception improvement by merely increasing the base station's downlink power for transmission. The power increase not only places a burden on the base station's amplifier system for range extension, but also does nothing to improve the signal-to-interference (S/I) ratio. An improvement in the S/I ratio may afford an increase in the traffic capacity or frequency-reuse density. Thus, a need exists for fully adaptive pattern shaping of downlink transmission to enhance the signal-to-interference ratio of the downlink signal.

SUMMARY OF THE INVENTION

In accordance with the invention, an antenna array system is capable of serving a base station for both uplink reception and downlink transmission. The antenna array system includes a first array and a second array spaced apart from the first array. The first array represents a transmit array for downlink transmissions, while a combination of the first array and the second array are referred to as a diversity arrangement for uplink reception.

In one aspect of the invention, the antenna system includes a suitable number and spatial arrangement of antenna elements to avoid lobe definition problems, while maintaining adequate decorrelation in received signals (received at the first array and the second array) to combat fast fading. In another aspect of the invention, both uplink signal-to-interference (S/I) and downlink S/I are enhanced by using adaptive radiation techniques in both the transmit mode and the receive mode. Because common antenna components are used both for the transmit and the receive mode, the antenna array system minimizes the required ancillary equipment, such as antennas, transmission lines, hardware, connectors, and monitoring receivers.

DETAILED DESCRIPTION

Figure 1:
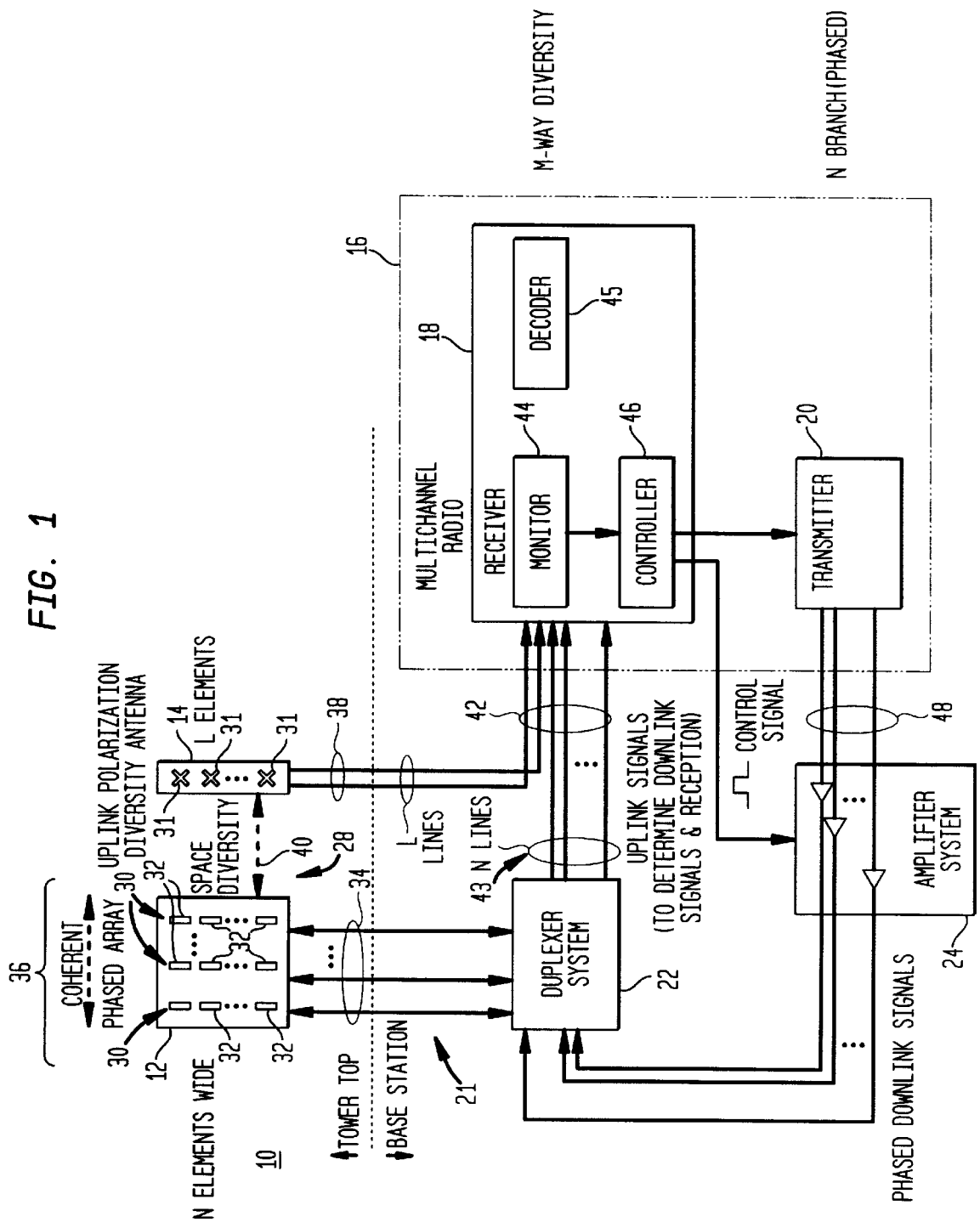
FIG. 1 through FIG. 8 show various illustrative embodiments of an antenna array system in accordance with the invention.

In accordance with the invention, FIG. 1 shows an antenna array system 10 coupled to wireless infrastructure. The antenna array system 10 includes a first array 12 spaced apart from a second array 14 by a spatial separation 40 sufficient to yield spatial diversity gain. The wireless infrastructure includes a base station 16 having a receiver 18 and a transmitter 20. The receiver 18 and the transmitter 20 are coupled to a duplexer system 22. An amplifier system 24 may be included to provide amplification of the transmitted signal from the transmitter 20. The first array 12 has first antenna ports 34 coupled to the duplexer system 22. The second array 14 has second antenna ports 38 coupled to the receiver 18.

The antenna array system 10 of FIG. 1 is capable of serving a base station 16 for both uplink reception and downlink transmission. The first array 12 represents a transmit array for downlink transmissions. A combination of the first array 12 and the second array 14 are referred to as a diversity arrangement 28 for uplink reception. The diversity arrangement 28 features coherent characteristics within the first array 12 for accurately determining the angle of arrival of a received signal, or complex phase, magnitude, and time-delay weights. The phase, magnitude, time-delay weights, or any combination of the foregoing, may be used determine control signals for directing the downlink transmission radiation patterns. The diversity arrangement 28 features noncoherent characteristics for mitigating fading and enhancing space-diversity gain. As used herein, coherence refers a correlation relationship between receive signals from any two different antenna elements (or groups 30) that are more or less correlated in response to the incidence of a signal wavefront.

In general, the first array 12 includes groups 30 of antenna elements 32 arranged to produce a transmit radiation pattern with directional and steerable characteristics, if appropriately fed in a controlled manner by one or more transmit signal branches 21. In the first array 12, each group 30 has a corresponding first antenna port 34. The first array 12 may comprise a matrix 36 of antenna elements 32 wherein each group 30 represents a lineal column of antenna elements 32 within the matrix 36. The lineal column is usually vertically oriented as shown to focus the radiation pattern in the elevation plane (i.e. vertical plane). The lineal column may be fed (e.g., end-fed or center-fed) via a first antenna port 34 and transmission line such that the phase relationship between the antenna elements 12 in a lineal column is known and fixed.

The number of groups 30 determines the size of the horizontal aperture and the characteristics of possible radiation patterns in the azimuthal plane (i.e. horizontal plane). The first array 12 has at least two groups 30 of antenna elements 32. However, the first array 12 preferably includes four or more groups 30 to generate suitably focused patterns for the downlink transmission. Four or more groups also facilitates the employment of at least two suitably decorrelated receive signal branches among the receive signal branches (at N receive inputs 43) of the diversity arrangement 28 from the first array 12 in the receive mode. A cross-correlation of zero is optimally decorrelated, whereas a cross-correlation of 1 is fully correlated. A pair of decorrelated receive signal branches may exist between a first antenna port 34 of the first array 12 and a second antenna port 38 of the second array 14, among other possible pairs.

Although FIG. 1 shows the first array 12 has four first antenna ports 34, implying four groups 30 of antenna elements 32, the first array 12 may have any number (N) of first antenna ports. The range of four to ten groups of antenna elements 32 is most practical for the size, weight, and wind-loading accommodations of the first array 12 under typical antenna mounting conditions.

The first array 12 preferably comprises a compact "non-sparse" array to steer energy to or from one or more mobile stations of interest. A non-sparse array refers to the elements 32 or groups 30 that are spaced sufficiently close to avoid grating lobes, spatial aliasing, or lobe definition problems. The first array 12 requires a minimum number of antenna elements 32 or groups 30 as necessary to fill the aperture and avoid lobe definition problems.

In the receive mode, the first array 12 is capable of providing the receiver 18 with unambiguous information on the direction of arrival or the underlying antenna control data (e.g., any representation of complex phase, magnitude, time delay weights, or any combination of the foregoing) associated with a received signal from a mobile station. The unambiguous information is provided via the first antenna ports 34 and receive inputs 43. The diversity arrangement 28 provides spatial diversity reception among two or more receive signal branches corresponding to the set of first antenna ports 34 and the set of second antenna ports 38. Cross-correlations between signals, from the first array 12 and the second array 14, on any two of the antenna ports (34,38) are sufficiently decorrelated to realize diversity gain.

The cross-correlations represent varying degrees of independence between receive signals at the groups 30 of antenna elements 32. The antenna elements 32 of the first array 12 and the second array 14 that are furthest apart generally have the greatest independence or the lowest cross-correlation with respect to each other. If the first array 12 has at least four signal branches and the second array 14 has at least two branches, at least six potential independent receive branches are available for the receiver 18 to combine, or otherwise process, in a manner to achieve diversity gain. Such diversity gain many not only include gain from spatial diversity, but readily may include gain from polarization diversity between the first array 12 and the second array 14, or within a second array 14.

The first array 12 may provide a coherent gain if adjacent antenna elements 32 or groups 30 are separated by a maximum allowable spacing or less.

For example, the maximum allowable spacing may be less than or equal to one wavelength (e.g., one-half wavelength in the horizontal direction) at the frequency of operation. The coherent gain is governed by the formula G=10 log(N), where N is the number of columnar groups 30 and G is the gain above a single columnar group of antenna elements 32.

For maximum polarization matching between the polarization of the antenna array system 10 for downlink transmission and the average polarization of mobile antenna of mobile stations for downlink reception, the first array 12 is preferably vertically polarized. However, in alternate embodiments the first array 12 may use horizontal polarization, slanted polarization, circular polarization, or any combination of the foregoing polarizations. Because the antenna elements 32 in the first array 12 are generally spaced apart by only fractional wavelengths in the azimuth direction (horizontal) to be non-sparse, the phase of the received wavefront is described as coherent across the first array 12.

The adjacent antenna elements 32 (or groups 30) of the first array 12 are more closely spaced than the spatial separation 40 between the first array 12 and the second array 14 such that the first array 12 prevents lobe definition problems and the diversity arrangement 28 improves immunity to fast fading. The spatial separation 40 is generally selected such that the antenna elements 32 of the first array 12 are separated from the antenna elements 31 of the second array within a range from five wavelengths to twenty wavelengths at the frequency of operation, although other suitable wavelength distances may fall within the scope of the invention. The combination of the smaller spatial span (e.g., horizontal distance) between adjacent antenna elements 32 of the first array 12 and the larger spatial separation 40 yields performance in the receive mode that is well-suited for estimating antenna control data underlying the direction of arrival of the received signal and for reducing fading with diversity gain. The antenna control data underlying the direction of arrival includes complex phase, magnitude, time delay weights, or any combination of the foregoing, associated with a received signal.

The second array 14 has at least one group of antenna elements 31 that are dedicated to receive-only mode operation. The second array 14 has second antenna ports 38. The second array 14 preferably includes an array of dual-slanted antenna elements 31, as symbolically indicated by the "X's" in FIG. 1. The dual-slanted antenna elements 31 may have +45 degrees and −45 degrees slanted polarization (relative to a vertical polarization of 0 degrees), although other polarization orientations are suitable for practicing the invention. The dual slanted antenna elements 31 provide two output ports that are both decorrelated from each other and decorrelated from the first array 12. The antenna elements 31 are decorrelated from each other due to the use of dual polarization. The antenna elements 31 are decorrelated from the first array 12 because of spatial diversity (e.g., horizontal spacing).

The diversity arrangement 28 achieves adequate diversity performance among four or more signal branches through both a suitable spatial separation 40 between the first array 12 and the second array 14, and polarization diversity within the second array 14. Although FIG. 1 shows the spatial separation as horizontal, the spatial separation may be horizontal, vertical, or offset in any other direction. Accordingly, the diversity arrangement 28 may mitigate signal fading and enhance uplink reception by providing both space-diversity gain and polarization-diversity gain.

In an alternate embodiment, the antenna array system 10 is configured to maximize decorrelation between the first array 12 and the second array 14. Illustrative techniques for maximizing such decorrelation include vertical spatial separation 40 between the first array 12 and the second array 14, the use of different polarization such as horizontal or circular polarization, or by additional spatial separation 40 (e.g., greater vertical or horizontal distance between the first array 12 and the second array 14). In another alternate embodiment, the first array 12 is multi-polarized (e.g., dual-polarized or tri-polarized) and second array 14 is dual-polarized.

The receiver 18 has M receive inputs 42 according to the equation M=N+L, wherein N is the total number of first antenna ports 34 for the first array 12 and L is the total number of second antenna ports 38 for the second array 14. Here, in FIG. 1 the receiver 18 has at least M=6 inputs (in this case N=4 for the transmit array, and L=2 for the receive only array).

The receiver 18 supports two separate functions: (1) adjusting (e.g., optimizing) uplink reception of the uplink signal from one or more desired mobile stations by forming an appropriate receive radiation pattern (or patterns) and (2) facilitating the proper choice of a transmit radiation pattern (or patterns) for downlink transmission based on the related, selected receive radiation pattern (or patterns).

The receiver includes a decoder 45 for reception of the uplink signal and for demodulating data, voice, or other communications traffic. The decoder 45 is adapted to perform diversity reception processing for two or more receive signal branches according to an algorithm, a logic circuit, or another scheme that realizes diversity gain. For example, the decoder 45 may provide diversity reception processing on all of the M provided receive signal branches.

The receiver 18 includes a monitor 44 for monitoring antenna control settings that yield an optimum, or otherwise appropriate, receive signal and receive radiation pattern. The antenna control settings include an amplitude setting (e.g., amplifier gain), a phase setting, signal parameter weights, time-delay weights, or any combination of the foregoing.

The receiver 18 includes a controller 46 for adjusting the transmit radiation pattern to be consistent with the receive radiation pattern that yields an optimum, or otherwise ample receive signal. The monitor 44 may determine the direction of arrival of a receive signal at the first array 12. However, the monitor 44 need only determine the control data (e.g., complex magnitude, phase, and/or time delay weights) for the first array 12 that underlies the direction of arrival. Advantageously, one receiver 18 can provide suitable control data for both the uplink diversity processing function and the downlink beam-steering function, without any duplication of receiving hardware.

The controller 46 is adapted to change the downlink transmit radiation pattern, the uplink receive radiation pattern, or both. If the monitor 44 determines a suitable receive radiation pattern for one or more mobile stations, the controller 46 may generate appropriate commands to produce a transmit radiation pattern (or patterns) having similar directional characteristics to the receive radiation pattern (or patterns). The controller 46 translates receive antenna control settings (provided by the monitor 44) into transmit antenna control settings (or weights) to account for differences between transmit and receive frequencies, among other factors.

In one embodiment, the choice of transmit radiation patterns, receive radiation patterns, or both may correspond to switch settings. In another embodiment the radiation patterns may be controlled by phase and magnitude settings. For example, radiation patterns may be manipulated by phase and magnitude settings (e.g., weights) from a pre-set table to form one radiation pattern from a finite set of radiation patterns. Where phase and magnitude settings are used, an algorithmic optimization of the phase and magnitude settings is possible. The controller 46 may individually control a gain setting of each amplifier in the amplifier system 24 to adjust the transmit radiation pattern. Either alone or in combination with the foregoing gain adjustment, the controller may individually control the relative phases of signals of each transmitter branch 48 to adjust the transmit radiation pattern.

In an alternate embodiment, time-delay settings may be used to control transmit radiation patterns, receive radiation patterns, or both. The time-delay settings are used to optimize space-time filtering characteristics of filters coupled to the antenna array system.

Adjusting the transmit radiation pattern or downlink transmission may be as simple as switching among different sets of preset phase and magnitude weights. Such an adjustment technique is referred to as the fixed beam steering approach. If continuously variable phase and amplitude settings are used to adjust the transmit radiation pattern, for example, from the baseband signal, the phase relationship between the signal branches 48 must be known, fixed, or controllable. The fixed beam steering approach may be applied to downlink transmissions. The steering is determined by using the uplink reception phased array weights as an estimate of the optimum downlink transmission radiation pattern.

In an alternate embodiment, an alternate controller provides a control signal for digitally controlling the first array 12 at baseband to tailor downlink transmission of a signal to a mobile station based on reception from the mobile station at the first array 12 and the second array 14.

The receiver 18 processes at least the magnitude weights (and preferably both the phase and magnitude weights) among the M receive branches 42 to sum all the inputs together to optimize the S(I+N) ratio (Signal-to-interference plus noise) of the receiver 18, while the monitor 44 monitors the processing. For the uplink, the receiver processing is geared to achieve both optimum diversity gain and optimum beam shape. The diversity gain and beam-shape provide gain relative to the use of a single antenna element or singular group 30. Diversity gain is especially valuable against fading, while beam gain is advantageous against co-channel interference sources. Beam gain provides spatial selectivity that can be used to attenuate interferers relative to the desired signal.

The receiver 18 has M receive branches 42 for processing receive signals from the first array 12 and the second array 14. The receive branches 42 of the receiver 18 that are coupled to the first antenna ports 34 (N total) achieve the beam shaping for spatial filtering, while the receive branches 42 of the receiver 18 that are coupled to the second antenna ports 38 (L total) help ensure adequate performance against fast fading due to the increased spatial separation. The total of M receive branches preferably equals the sum of N antenna ports and L antenna ports.

The monitor 42 and the controller 46 cooperate to determine suitable weightings to use for downlink transmission. In this case, only the first antenna ports 34 are used because the signals at the first antenna ports 34 characterize the first array 12 to be used for the transmit mode. In general, for the transmit mode, the magnitude and the phase weights for each of the four (or more) antenna groups 30 can be determined for the first array 12 during the receive mode through reception of the first array 12. Compensation algorithms can be used to average receive mode measurements over time and fading to produce a suitable control signal for the downlink transmission. Further, in alternate embodiments algorithms can compensate for the effects of phase shifts due to the frequency offset between transmit and receive in most cellular type systems (e.g., frequency division duplex).

The antenna array system 10 provides adequate independence (immunity to correlated fast fading) across the receive antenna ports 42, while the first array 12 provides nonlobing transmit beams, which are observable across the transmit antenna ports (34). Receive antenna ports refer to first antenna ports 34 of the first array 12 and second antenna ports 38 of the second array 14. Transmit antenna ports refer to the first antenna ports 34 of the first array 12 that are active during transmitting.

In the transmit mode, the antenna array system 10 provides both high gain (e.g., greater than 10 dBi) and spatial steering for transmission of the downlink signal. In the receive mode, the antenna array system 10 provides multiple inputs for the uplink receiver 18 system. The antenna array system 10 may operate contemporaneously in the transmit mode and the receive mode.

In the receive mode, the antenna array system 10 provides both high gain and spatial steering for reception of uplink signals. The inclusion of the second array 14 enhances the diversity performance. The enhanced diversity performance reduces fading by primarily providing increased diversity gain of up to 6 dB or more. The receiver 18 is adapted to process the phase and magnitude weights among different receive branches to sum two or more receive branches together to enhance the signal-to-interference ratio. The second array 14 represents an additional "outboard" receiver 18 array for providing additional diversity (independence from fast fading) that only alternative polarizations (dual slant or vertical & horizontal) and/or large separation (5–20 wavelengths) can provide.

The space-diversity arrangement 28 uses adaptive array techniques for uplink reception, while the first array 12 supports a variety of downlink transmission techniques. Accordingly, an adaptive array reception yields both improved receiver 18 sensitivity (improved signal-to-noise (S/N)) and improved receiver 18 immunity to interference (improved signal-to-interference (S/I) performance). Thus, the adaptive array reception allows significant traffic capacity improvements in wireless systems via increased frequency reuse.

Figure 6:
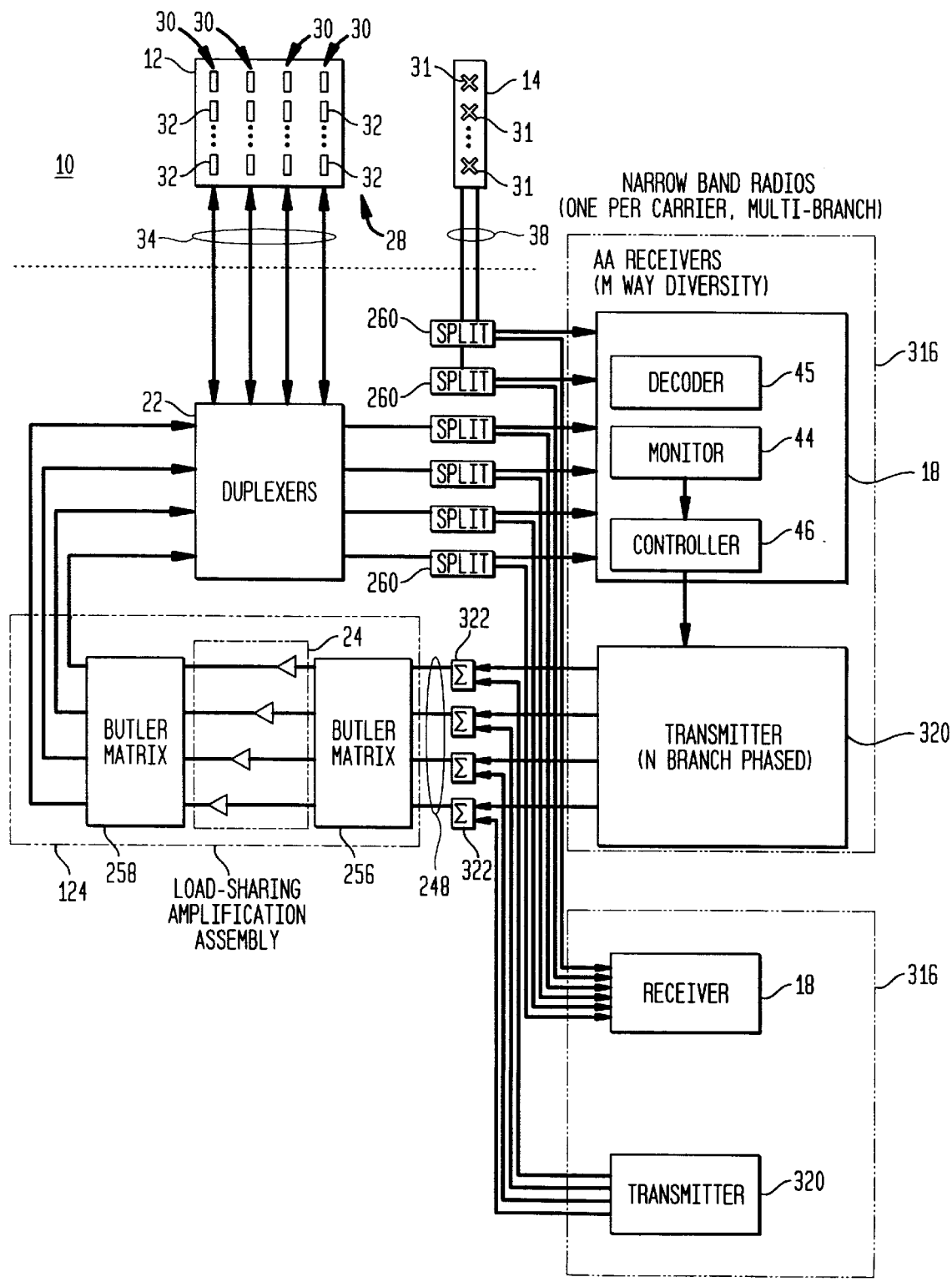
Figure 7:
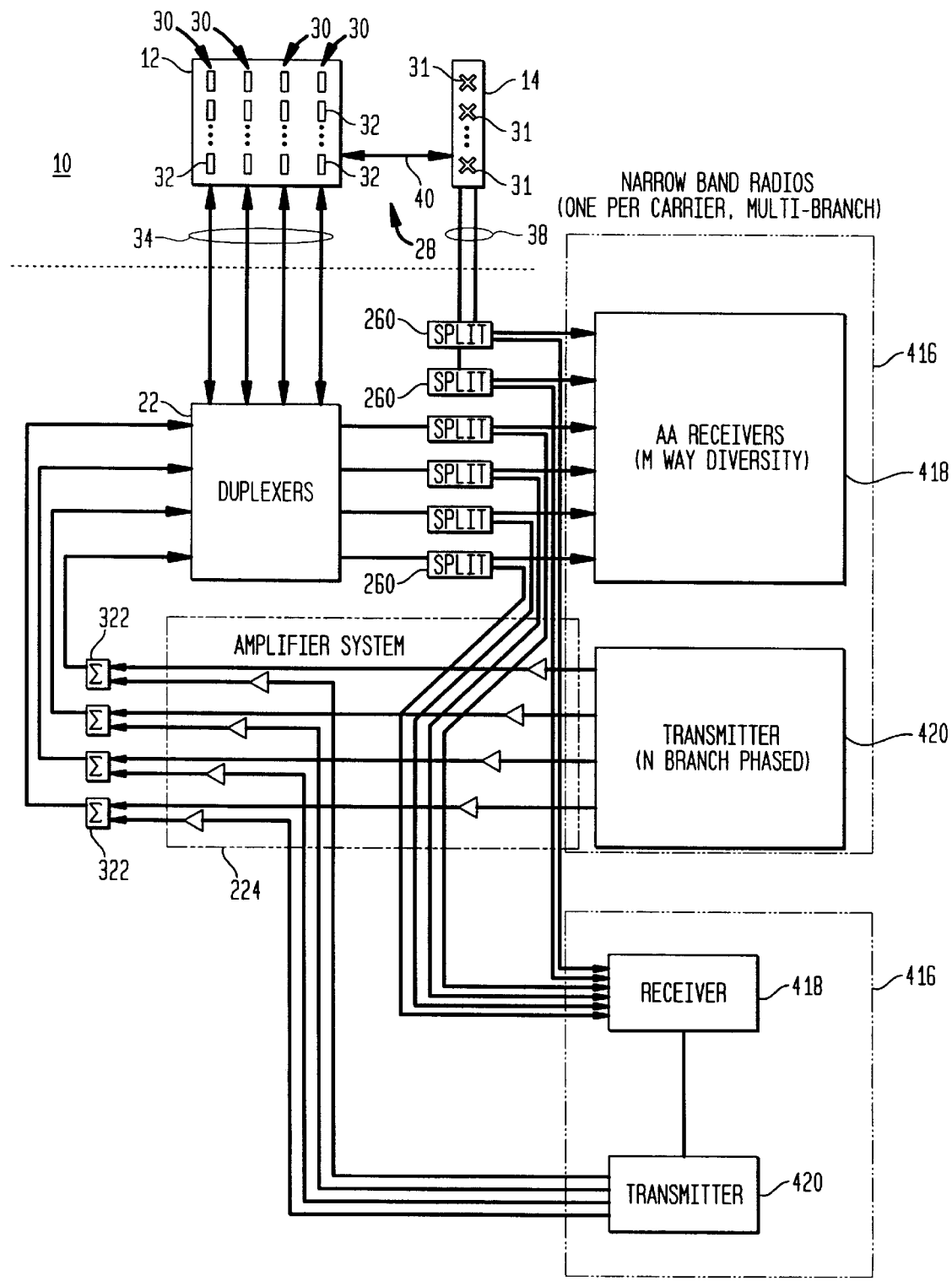
Figure 8:
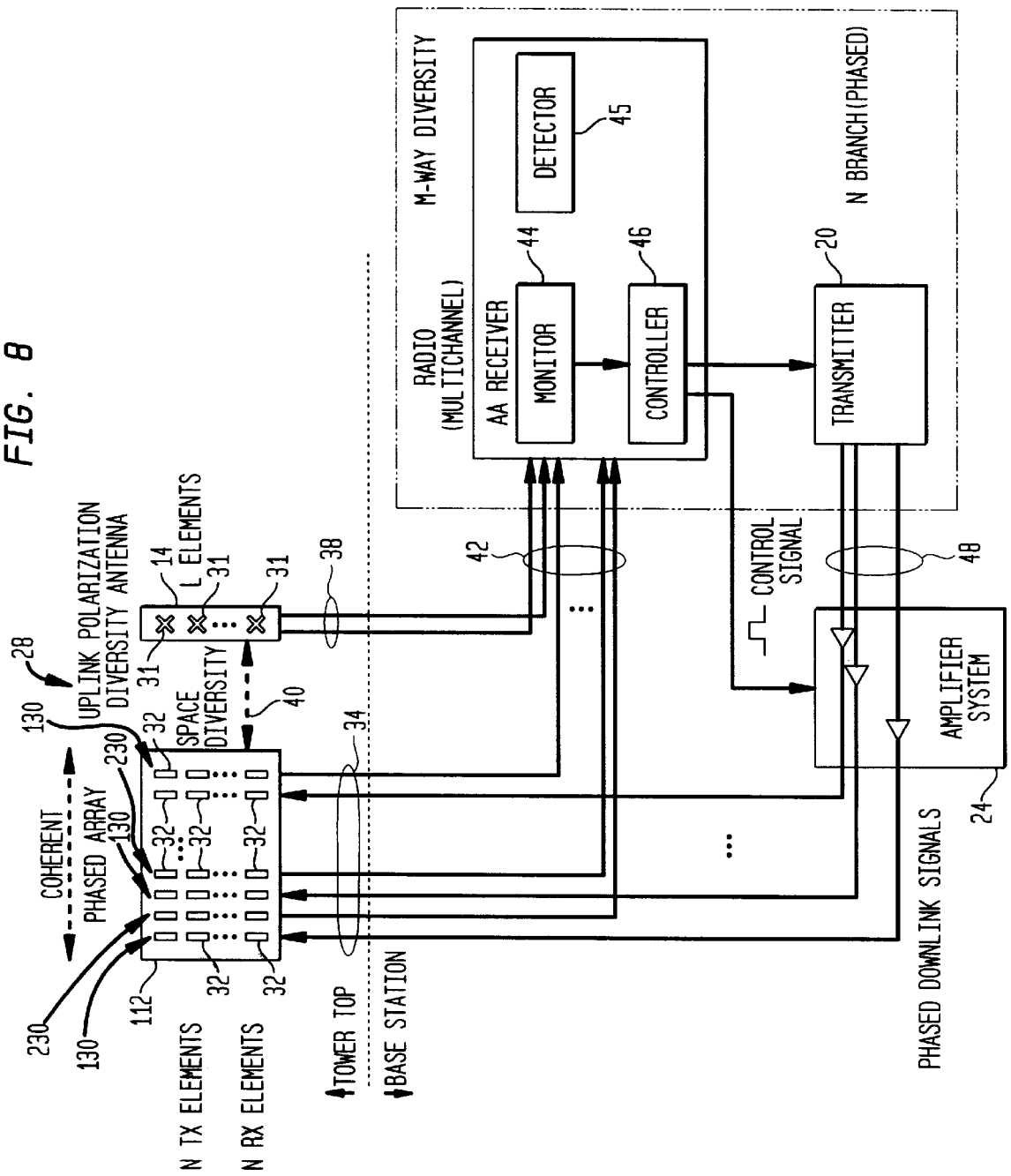

The antenna system supports many variations of wireless infrastructure as illustrated in FIG. 2 through FIG. 8. In particular, FIG. 2. through FIG. 8 show the antenna system of the invention in applications with narrow-band radios, wide-band radios, adaptive array transmission, steered beam transmission, switched beam transmission, and load sharing across an amplifier array.

Figure 2:
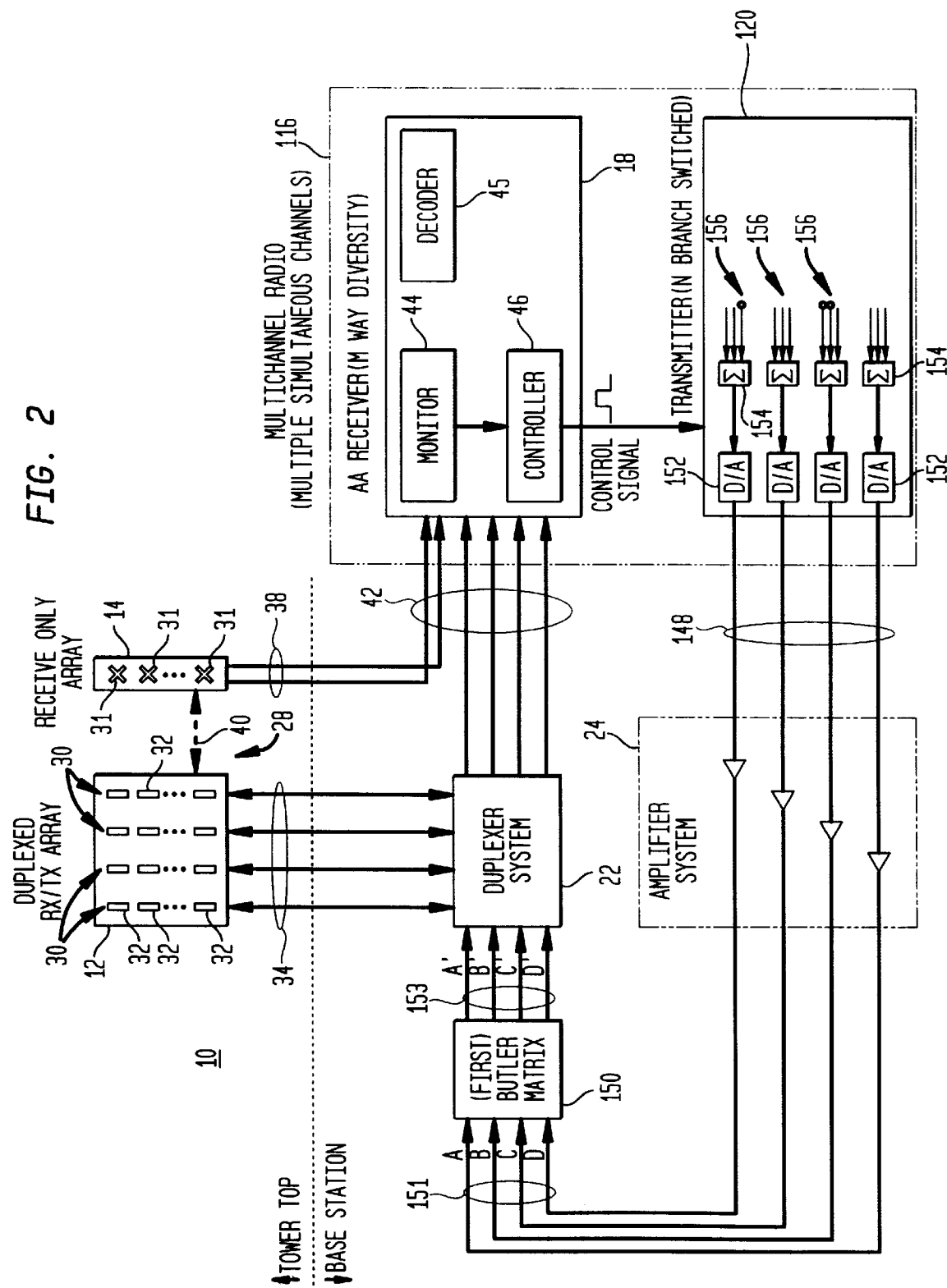

The antenna array system of FIG. 2 is similar to the antenna array of FIG. 1 except for the addition of the Butler matrix 150 between the duplexer system 22 and the amplifier system 24 and a transmitter 120 with N switched transmit branches 148. Like reference numerals in FIG. 1 and FIG. 2 indicate like elements.

In FIG. 1, the transmit branches 148 from the transmitter 20 to each transmit antenna group 30 must be phase calibrated. However, the system shown in FIG. 2 allows uncalibrated transmission paths (with respect to electrical phase) from the radio transmitter 120 to a Butler matrix 150.

The transmitter 120 associated with the base station 116 includes a plurality of summing circuits 154 and corresponding digital-to-analog converters 152. The inputs of the summing circuits 154 accept signals from active communication channels of the transmitter 120. Each summing circuit 154 sums the active transmit inputs before a corresponding digital-to-analog converter 152 converts the summed signal into a respective analog signal. The amplifier system 24 amplifies the converted analog signal from the converter 152. The amplifier system 24 preferably contains amplifiers with a sufficient bandwidth and other characteristics of multi-carrier linear amplifiers (MCLAs), because multiple simultaneous signals may be amplified by each amplifier.

By simply switching the states of the summer inputs 156 from "off" to "on", the transmit antenna radiation pattern may be changed. For example, each channel may be applied to a different summing circuit 156 to yield a different transmit radiation pattern. Heavy dots at the summer inputs 156 indicate the transmitter paths having active switch selections. This diagram shows three simultaneously active transmit channels for illustrative purposes (three simultaneous RF carriers). Each of these three radio outputs may be interconnected to any of the summer inputs 156 and one radio output may be interconnected to multiple summer inputs 156 simultaneously to yield a desired transmit radiation pattern at the first array 12 after the impact of the Butler matrix 150. In this system, the outputs of a single radio channel element on the transmit branches 148 are simply on/off decisions. For a time-division multiple access (TDMA) or Global System for Mobile Communications (GSM) system, each radio channel element would represent one voice channel call on a specific timeslot on a particular RF carrier. For an analog Advanced Mobile Phone Service (AMPS) system, each voice channel element is a single RF carrier.

In FIG. 2 the antenna array system 10 may require no magnitude adjustment in the amplifiers or phase weighting by manipulating phase relationships among transmit signals. Instead, the functions achieved by the magnitude weighting and any phase weighting of FIG. 1 are preferably performed by the Butler matrix 150 in cooperation with selective applications of the transmit signals to the summer inputs 156.

The Butler matrix 150 may include hybrids and phase shifters arranged to provide radio frequency input ports 151 and output ports 153. The Butler matrix 150 performs an approximation of a Fourier transform or an inverse Fourier transform on signal traversing between the input ports 151 and the output ports 153. The use of an N×N Butler matrix allows the N element transmit array to achieve N separate "fixed beams." A single input into one of the input ports 151 (e.g., port A) of the Butler matrix 150 creates a set of phased outputs at the 25 output ports 153 (e.g., A',B',C' and D') and at the duplexer system 22. The phased outputs are fed to the first antenna array 12, after appropriate filtering by the duplexer system 22, such that N independent, fixed beams are formed through interactions between the antenna elements 32 of the first array 12.

Figure 3:
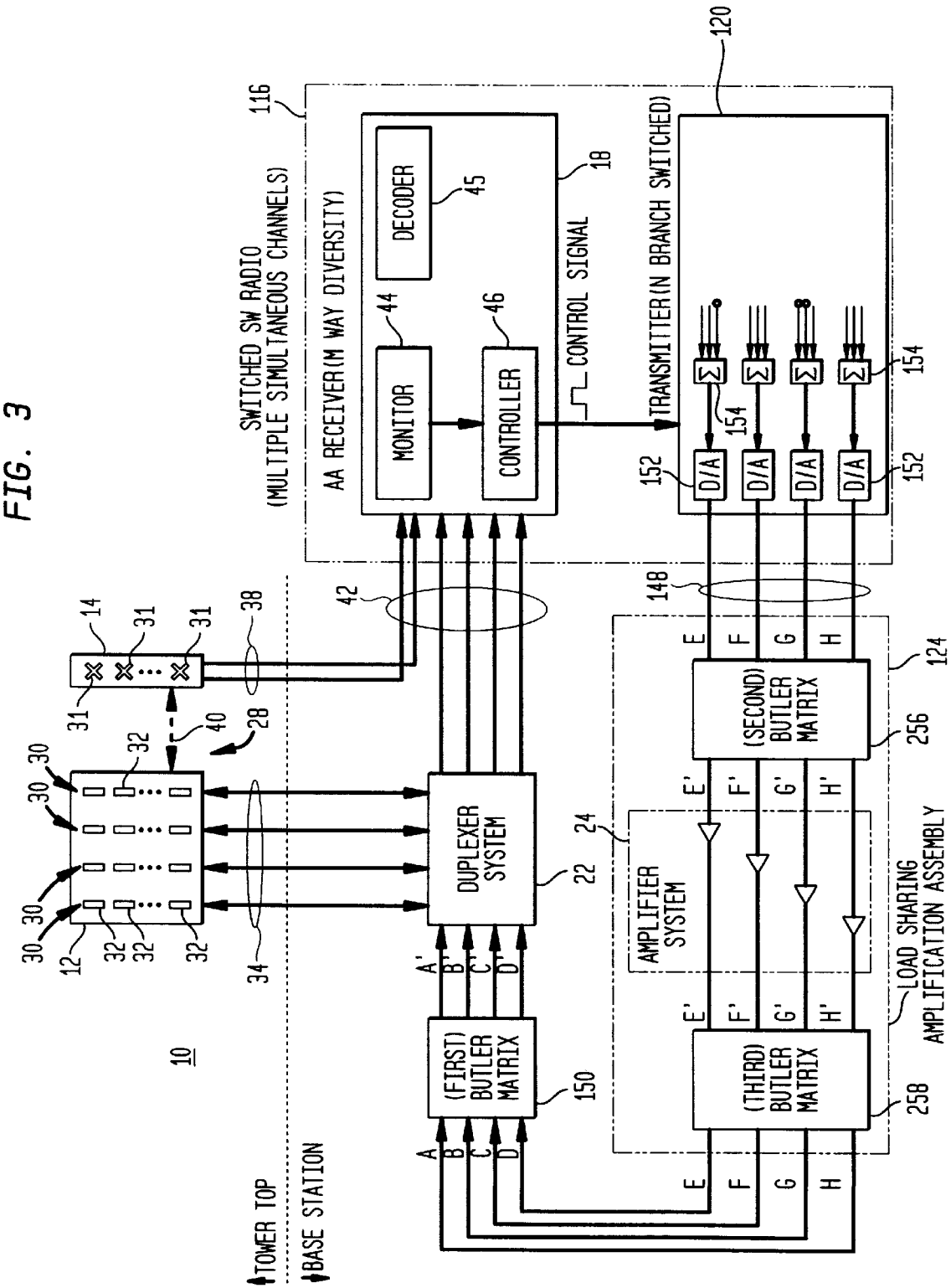

The antenna array system of FIG. 3 is similar to the antenna array system of FIG. 2 except for the addition of a pair (256,258) of Butler matrices to provide a load sharing amplification assembly 124. Like reference numerals in FIG. 1 and FIG. 3 indicate like elements. The Butler matrices in FIG. 3 are referred to as the first Butler matrix 150, the second Butler matrix 256, and the third Butler matrix 258. The function and structure of the Butler matrices (256, 258) is substantially identical to that of the Butler matrix 150 of FIG. 2. The second Butler matrix 256 is connected between the amplifier system 24 and the transmitter 120. The third Butler matrix 258 is connected between the amplifier system 24 and the first Butler matrix 150. The combination of the second Butler matrix 256, the third Butler matrix 258, and the amplifier system 24 comprises a load sharing amplification assembly 124. The arrangement of the second and third Butler matrices (256, 258) cooperates with the amplifier to allow load sharing of the power amplification among a number of parallel amplifiers within the amplifier system 24.

The third Butler matrix 258 sums the independent amplifier outputs to create N composite ports and undoes any phase change initiated by the second Butler matrix 256 so the Butler matrix pair (256, 258) does not produce any relative shifting of the phases (other than uniform delay) with respect to the input lines (e.g., E, F, G, and H) of the second Butler matrix 256 and corresponding output lines (e.g., E, F, G, and H) of the third Butler matrix 258.

The second Butler matrix 256 distributes a transmit input signal at one of the input lines (e.g., E) among multiple inputs (e.g., E', F', G' and H') to the amplifiers in the amplifier system 24. The third Butler matrix 258 accepts multiple outputs (e.g., E', F', G' and H') from the amplifiers and maps the multiple outputs associated with the same transmit signal to one output line (e.g., E) of third Butler matrix 258.

Figure 4:
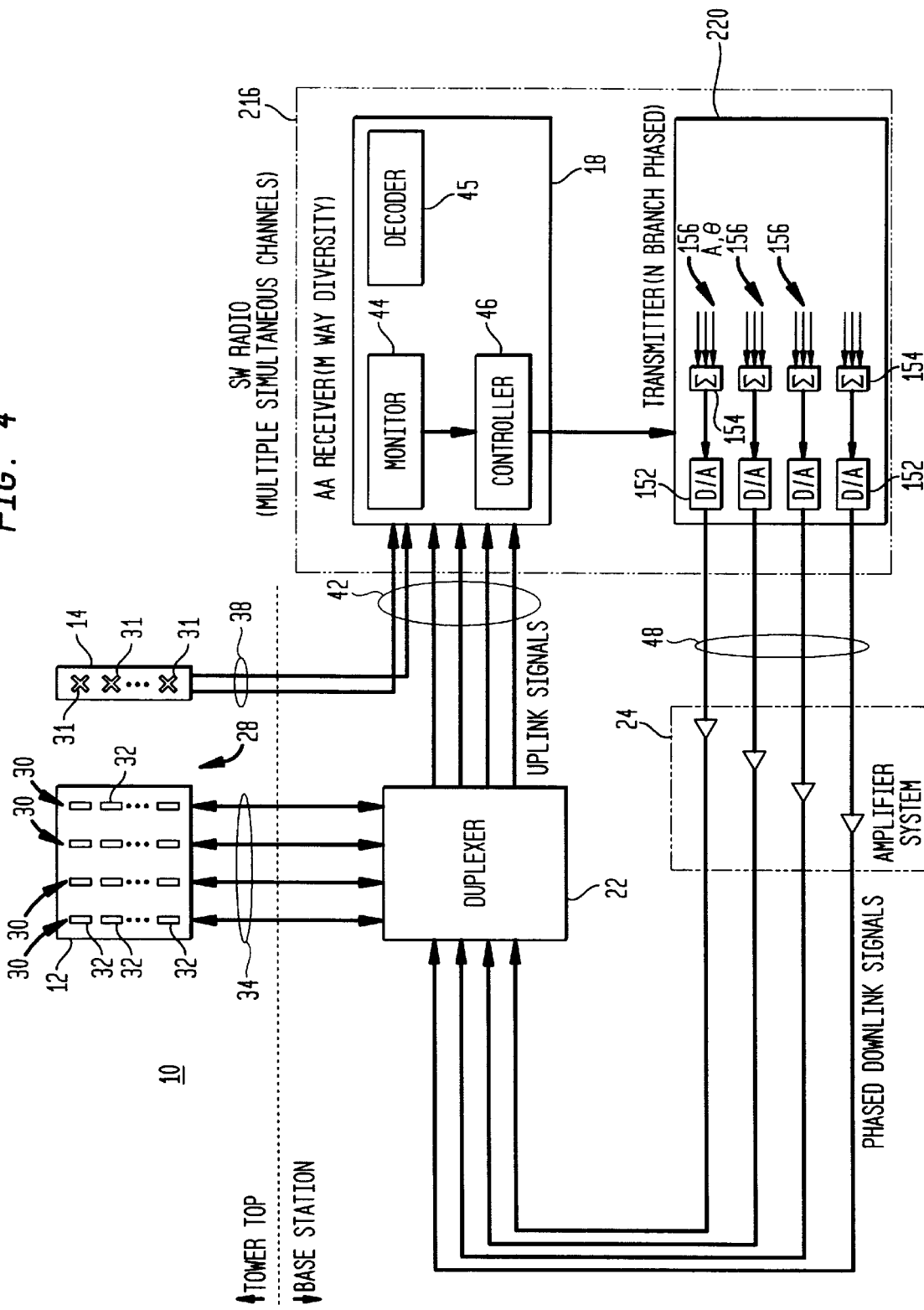

The antenna array system of FIG. 4 is similar to the antenna array system of FIG. 1 except for a transmitter 220 with N phased branches 48, as shown. Like reference numerals in FIG. 1 and FIG. 4 indicate like elements. FIG. 4 is well-suited for a use as a true adaptive array in the transmit mode in that the transmit radiation pattern is not limited to a fixed number of states. Rather, the transmit radiation pattern may be continuously variable. The base station 216 includes the transmitter 220 and the receiver 18. The transmitter 220 includes a summing circuit 154 coupled to corresponding digital-to-analog converters 152. Here, each summing circuit 154 first digitally sums one or more outputs for each modulated channel in a proper and known phase relationship to produce a desired transmit radiation pattern on the first array 12. Second, the digital-to-analog converters 152 convert the summed signals into analog signals. Third, the converted signals are sent directly to the first antenna array 12, via the amplifier system 24, without further adjustment with the phase or amplitude relationships because the phase relationships between signals propagating in the transmit signal branches 48 were established at baseband through the digital summing operation.

Figure 5:
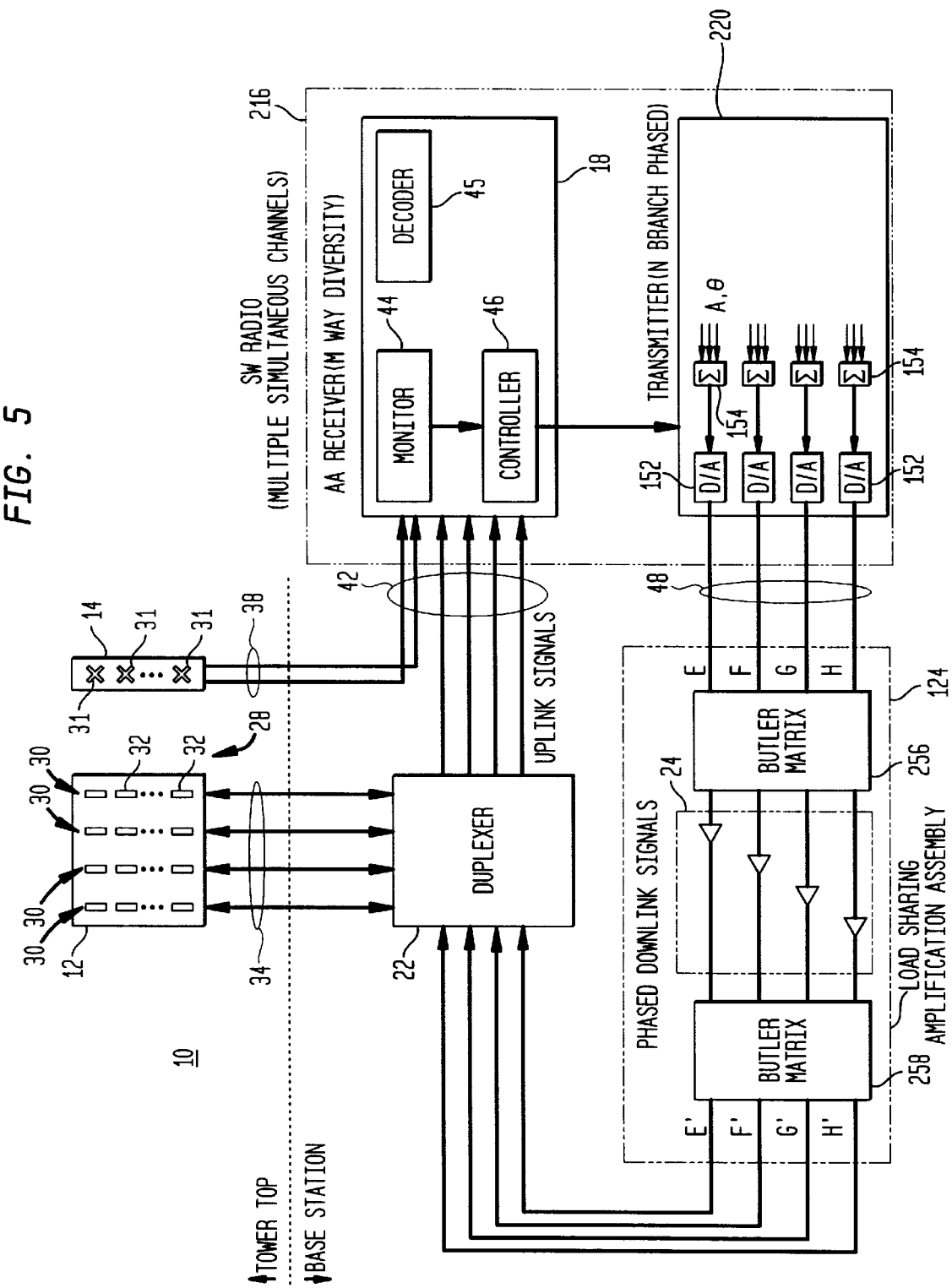

The antenna array system of FIG. 5 is similar to the antenna array system of FIG. 3 except a transmitter 220 has N phased branches 48. Like reference numerals in FIG. 3 and FIG. 5 indicate like elements. The dual Butler matrix configuration of FIG. 5 includes a first Butler matrix 256 and a second Butler matrix 258 to allow load sharing among the amplifiers in the amplifier system 24.

The architecture of FIG. 5 is different from those of FIG. 2 and FIG. 3 because phase relationships among the transmit signal branches 48 must be preserved, or at least calibrated, from the transmitter 220, through the pair of Butler matrices (256, 258), the amplifier system 24, the duplexer system 22, and all of the associated interconnecting transmission media (e.g., coaxial cable or hardline). That is, the appropriate phase and amplitude relationship may be established digitally at the baseband, as modified by the summing circuits 154, to yield a desired transmit radiation pattern of the first array 12. The architecture of FIG. 5 allows continuously variable beam shapes or transmit radiation patterns in a similar manner to FIG. 4, with the added feature of the load sharing amplification assembly 124 described in FIG. 3.

The antenna array system of FIG. 6 is similar to the antenna array of FIG. 5 except narrow-band radios 316 and splitters 260 are used for interconnecting the narrow band radios 316 to the first array 12 and the second array 14. Each narrow band radio 316 comprises a base station that supports as few as one channel for communications to a mobile station. The splitters 260 are coupled into the transmission media between the receivers 18 and the duplexer system 22. Although the splitter 260 has two output ports as shown in FIG. 6, in practice the number of splitter outputs may equal the number of narrow-band radios 316. Like reference numerals in FIG. 5 and FIG. 6 indicate like elements.

FIG. 6 shows how the antenna system of the invention is backwards compatible with the use of narrow band radios (e.g., 316), where separate radio outputs are summed (either analog or in a digital fashion) before feeding a set of multi-carrier linear amplifiers in the amplifier system 24. The load sharing amplification system 124 facilitates load sharing among multiple amplifiers in the amplifier system 24. Here, each narrow-band radio 316 must be fed separate receive signals. Similarly, transmit signals from each radio's transmitter 320 must be combined at summers 322 from every narrow-band transmitter 320 to form composite transmit signals on the transmit branches 248 appropriate for input into the load sharing amplification assembly 124. Although each summer 322 has two inputs as shown, the number of summer inputs may be equal to the number of narrow-band radios 316.

The antenna array system of FIG. 7 is similar to the antenna array of FIG. 6, except the load sharing amplification assembly 124 of FIG. 6 is replaced by an amplifier system 224. Like reference numerals in FIG. 6 and FIG. 7 indicate like elements. The amplifiers of the amplifier system 224 cooperate with and feed the summers 322. The amplifier system 224 includes individual Carrier Linear Amplifiers (ICLAs) in an arrangement such that a separate amplifier is required for each transmit branch (of N total branches) of each narrow-band radio carrier. Accordingly, because the number of amplifiers grows by N×P in the amplifier system 224, where P is the number of separate RF carriers, the configuration of FIG. 7 may be limited in the practical maximum number of narrow-band radio carriers to maintain reasonable costs for the amplifier system 224.

The antenna array system of FIG. 8 is similar to the antenna array of FIG. 1 except the duplexer system 24 is eliminated, a first antenna array 112 contains two sub-arrays, and a monitor 114 performs a more elaborate translation between receive weightings and transmit weightings. Like reference numerals in FIG. 1 and FIG. 8 indicate like elements. FIG. 8 shows an architecture that does not use a duplexer system for filtering to separate transmit frequencies from reception frequencies. Instead, two commingled sub-arrays form the alternate first array 112. As illustrated, the first array 112 includes transmit vertical groups 130 alternating with receive vertical groups 230 such that every other column represents a portion of the transmit sub-array or a receive sub-array. The frequency difference between the transmit band and the receive band is used to obtain the necessary isolation between the transmit sub-array and the receive sub-array for proper operation. Nevertheless, the first array 112 is still able to provide spatial diversity in conjunction with the second array 14 during receive mode operation.

Figure 10:
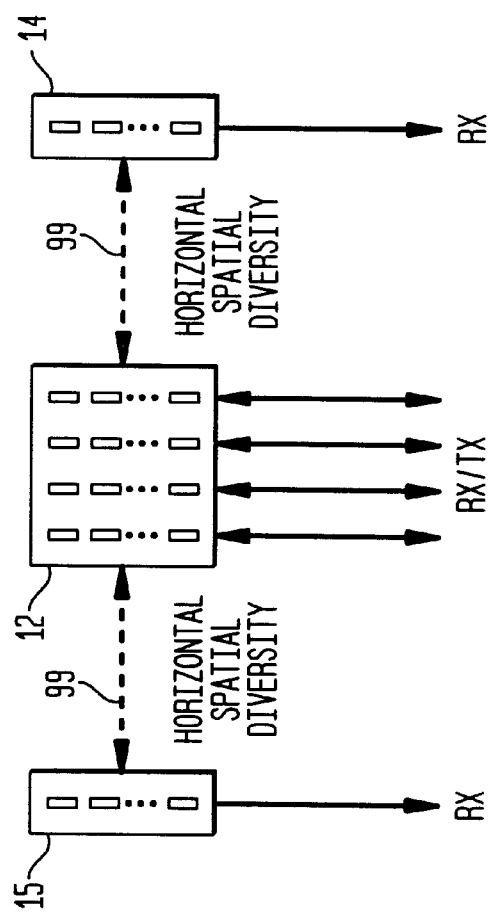
FIG. 10 illustrates application of the antenna array system to a horizontal spatial diversity arrangement.
Figure 9:
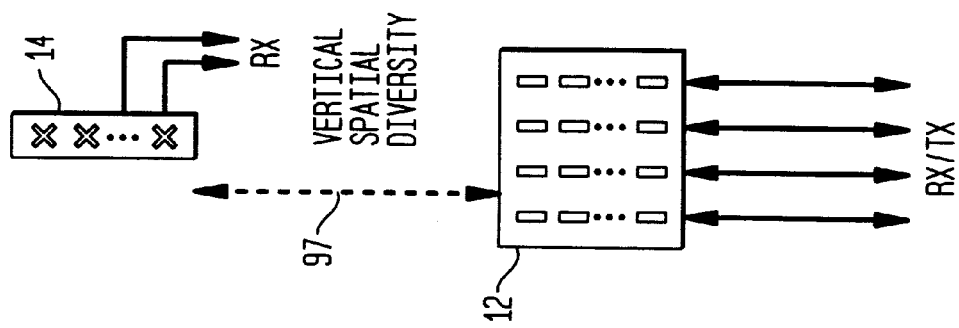
FIG. 9 illustrates application of the antenna array system to vertical spatial diversity arrangement.

FIG. 9 and FIG. 10 show alternative methods of achieving additional diversity for the two additional receiver diversity branches. In FIG. 9, the first array 12 and the second array 14 may be separated by a vertical separation 97 sufficient to yield a space diversity gain in the receive mode. In FIG. 10, the first array 12 and the second array 14 are further complemented by a third array 15. Both the second array 14 and the third array 15 are separated by a horizontal separation 99 from the first array sufficient to yield a space-diversity gain the in the receive mode.

Any of the foregoing embodiments of the antenna array system may be configured to mimic conventional sectored network base station connections such that the antenna system is compatible with standard base station configurations and typical infrastructure configurations. In a TDMA wireless system, the antenna array system may perform best with Discontinuous Transmit (DTX) deployed, but can be made to work with current IS-136 as well. The antenna array system can be applied to analog systems, such as AMPS, or digital systems, such as CDMA or GSM. The antenna array is readily configured in a manner that is compatible with installations of base stations and other wireless infrastructure equipment.

The antenna array system of the invention offers improved uplink and downlink link budget for increased coverage (improved range) via improved receiver sensitivity and improved effective antenna gain for transmission, as compared to conventional three sector and six sector systems. Also, the use of adaptive reception and transmission allows spatial filtering to reduce or eliminate interference both on the uplink and the downlink. The interference reduction may increase traffic capacity, for example, by allowing tighter frequency reuse.

Furthermore, the antenna system achieves improved performance by sharing the coherent array used for the transmit mode in the receive mode as well. The antenna design is regarded as compact, yet efficient, because of the overall antenna size, weight, and wind loading per the number of transmit ports and receive ports. The antenna system is well-suited for duplex operation to minimize the number of cables required.

In an alternate embodiment to any of the embodiments of FIG. 1 through FIG. 8, each antenna element of the first array, the second array, or both may itself be a vertical array in order to achieve a beam shape and gain the elevation plane. Generally, a half power beamwidth of 5 to 7 degrees is used in the vertical (elevation) plane to achieve an adequately high gain in the horizontal plane suitable for mobile communications environment. In another alternate embodiment, different beamwidths, different beam shapes, sidelobe suppression, and null-filling may be all be achieved by proper phasing of the vertical elements.

Although the first array 12 and the second array 14 have antenna elements organized in rectangular matrices as shown throughout FIG. 1 through FIG. 10, in another embodiment, the antenna array system 10 generally includes a first antenna assembly and a second antenna assembly of antenna elements arranged to provide coherent and noncoherent reception characteristics. Accordingly, the first array 12 and the second array 14 may be replaced by a functionally equivalent first antenna assembly and a second antenna assembly. The first antenna assembly comprises one or more antenna elements arranged in any geometric configuration consistent with the foregoing reception characteristics. The second antenna assembly comprises one or more antenna elements arranged in any geometric configuration consistent with the foregoing reception characteristics.

This specification describes various illustrative embodiments of the system and the method of the present invention. The scope of the claims is intended to cover various modifications and equivalent arrangements of the illustrative embodiments disclosed in the specification. Therefore, the following claims should be accorded the reasonably broadest interpretation to cover the modifications, equivalent structures, and features which are consistent with the spirit and the scope of the invention disclosed herein.

What is claimed is:

1. An antenna array system comprising:
    a first antenna assembly arranged to operate in both a transmit mode and a receive mode;
    a second antenna assembly spaced apart from the first antenna assembly by a separation sufficient to realize space diversity gain in the receive mode;
    a receiver for processing signals from the first antenna assembly and the second antenna assembly in the receive mode and for providing control signals for a transmit radiation pattern of the first antenna assembly in the transmit mode.

2. The antenna array system according to claim 1 wherein the receiver has an adaptive reception capability for adjusting a receive radiation pattern of at least one of the first antenna assembly and the second antenna assembly in the receive mode.

3. The antenna array system according to claim 1 wherein the first antenna assembly includes antenna elements and has spatial spans between the antenna elements of approximately one wavelength or less at the frequency of operation to avoid lobe definition problems.

4. The antenna array system according to claim 1 wherein the first antenna assembly includes antenna elements and has spatial spans between adjacent ones of the antenna elements and wherein said separation between the first and the second antenna assemblies is greater than each of the spatial spans.

5. The antenna array system according to claim 1 wherein the first antenna assembly includes vertical groups of antenna elements and has horizontal spatial spans between adjacent ones of the vertical groups such that the first antenna assembly is adapted to receive signals in a coherent manner.

6. The antenna array system according to claim 5 wherein the separation between the first antenna assembly and the second antenna assembly is arranged to receive signals in a noncoherent manner.

7. The antenna array system according to claim 1 wherein the first antenna assembly includes vertical columnar groups of antenna elements and has horizontal spatial spans between adjacent vertical columnar groups of less than or equal to one wavelength at the frequency of operation and wherein the separation between the first and the second antenna assembly is within a range from approximately five wavelengths to twenty wavelengths at the frequency of operation.

8. The array antenna system according to claim 1 wherein the second antenna assembly has a different polarization than the first antenna assembly.

9. The antenna array system according to claim 1 wherein the second antenna assembly has at least one group of antenna elements that are dedicated to operating in the receive mode.

10. The antenna array system according to claim 1, wherein the coverage pattern of the first and second antenna assemblies are same.

11. The antenna array system according to claim 1, wherein the second antenna assembly operates only in the receive mode.

12. An antenna array system comprising:
    a first array including a matrix of antenna elements arranged to operate in a transmit mode and a receive mode;
    a second array spaced apart from the first array by a separation sufficient to realize space diversity gain in the receive mode;

a receiver for processing signals from the first array and the second array in the receive mode and for providing control signals for a transmit radiation pattern of the first array in the transmit mode.

13. The antenna array system according to claim 12 wherein the receiver has an adaptive reception capability for adjusting a receive radiation pattern of at least one of the first array and the second array in the receive mode.

14. The antenna array system according to claim 12 wherein the first array has spatial spans between the antenna elements of approximately one wavelength or less at the frequency of operation to avoid lobe definition problems.

15. The antenna array system according to claim 12 wherein the first array has spatial spans between adjacent ones of the antenna elements and wherein said separation between the first and the second array is greater than each of the spatial spans.

16. The antenna array system according to claim 12 wherein the first array has horizontal spatial spans between adjacent vertical groups of the antenna elements such that the first array is adapted to receive signals in a coherent manner.

17. The antenna array system according to claim 16 wherein the separation between the first array and the second array is arranged to receive signals in a noncoherent manner.

18. The antenna array system according to claim 12 wherein the first array has horizontal spatial spans between adjacent vertical columnar groups of the antenna elements of less than or equal to one wavelength at the frequency of operation and wherein the separation between the first and the second array is within a range from approximately five wavelengths to twenty wavelengths at the frequency of operation.

19. The antenna array system according to claim 12 wherein the first array includes at least two groups of antenna elements with corresponding separate antenna ports for each group.

20. The antenna array system according to claim 12 wherein the antenna elements of the first array produce a coherent gain according to the formula $G=10 \log(N)$, where N is the number of lineal groups of the antenna elements and G is the gain above a single lineal group of the antenna elements.

21. The array antenna system according to claim 12 wherein the second array has a different polarization than the first array.

22. The array antenna system according to claim 12 wherein the first array is vertically polarized and second array is dual-polarized.

23. The array antenna system according to claim 12 wherein the first array is multi-polarized and second array is dual-polarized.

24. The antenna array system according to claim 12 wherein the second array has at least one group of antenna elements that are dedicated to receive-mode only operation.

25. The antenna array system according to claim 12 wherein the second array includes dual-polarized antenna elements having +45 degrees and −45 degrees slanted polarizations, with reference to 0 degrees vertical polarization.

26. The antenna array system according to claim 12 wherein the first array and the second array are vertically separated.

27. The antenna array system according to claim 12 wherein the first array and the second array are horizontally separated.

28. The antenna array system according to claim 12, wherein the coverage pattern of the first and second arrays are same.

29. The antenna array system according to claim 12, wherein the second array operates only in the receive mode.

30. An antenna array system comprising:
a first array of antenna elements for operating in a transmit mode and a receive mode;
a second array of antenna elements spaced apart from the first array by a separation sufficient to realize space diversity gain in the receive mode;
a receiver having a monitor for monitoring a receive radiation pattern in the receive mode of the first array and the second array and a controller for providing control signals for a corresponding transmit radiation pattern of the first array in the transmit mode.

31. The antenna array system according to claim 30 wherein the first array has spatial spans between the antenna elements of approximately one wavelength or less at the frequency of operation to avoid grating lobe problems.

32. The antenna array system according to claim 30 wherein the first array has spatial spans between adjacent ones of the antenna elements and wherein the separation between the first and the second array is greater than each of the spatial spans.

33. The antenna array system according to claim 30 wherein the first array has horizontal spatial spans between adjacent vertical groups of the antenna elements such that the first array is adapted to receive signals in a coherent manner.

34. The antenna array system according to claim 33 wherein the separation between the first array and the second array is arranged to receive signals in a noncoherent manner.

35. The antenna array system according to claim 30 wherein the first array has horizontal spatial spans between adjacent vertical columnar groups of the antenna elements of less than or equal to approximately one wavelength at the frequency of operation and wherein the separation between the first and the second array is within a range from approximately five wavelengths to twenty wavelengths at the frequency of operation.

36. The antenna array system according to claim 30 wherein the controller provides the control signals for controlling the first array and the second array to maximize uplink reception of a signal from one or more desired mobile stations.

37. The antenna array system according to claim 30 wherein the controller provides the control signals for controlling the first array to provide a transmit radiation pattern comparable to the receive radiation pattern as perceived by the first array.

38. The antenna array system according to claim 30 wherein the monitor monitors an antenna control parameter comprising a receive magnitude setting and a receive phase setting.

39. The antenna array system according to claim 38 wherein the controller adjusts the transmit radiation patterns to be consistent with the antenna control parameter that yields a suitable receive signal.

40. The antenna array system according to claim 30 wherein the first array includes antenna ports coupled to corresponding antenna elements for forming the transmit radiation pattern and wherein the controller selects a switch setting to feed at least one of the antenna elements via at least one of the respective antenna ports.

41. The antenna array system according to claim 30 further comprising a Butler matrix for providing transmit signals to the first array and wherein the controller adjusts the transmit signals inputted, directly or indirectly, into the Butler matrix to form the transmit radiation pattern.

42. The antenna array system according to claim 30 wherein the controller adjusts a transmit radiation pattern by switching to one of a set of preset phase and magnitude weights based on an interpretation of the received signals from the first array.

43. The antenna array system according to claim 42 wherein the receiver processes the phase and magnitude weights among branches to sum two or more branches together to enhance the signal-to-interference ratio at the receiver from the first array and the second array.

44. The antenna array system according to claim 30 wherein the controller is adapted to adjust a downlink transmit radiation pattern based upon uplink receive signals from the first array as an estimate of an optimum transmission radiation pattern.

45. The antenna array system according to claim 30 wherein the second array has dual-slanted polarization and a separation of approximately five to twenty wavelengths from the first array.

46. The antenna array system according to claim 30 wherein the receiver includes multiple receive branches for processing receive signals from the first array to provide beam shaping for interference reduction.

47. The antenna array system according to claim 30 wherein the receiver includes multiple receive branches for processing receive signals from the second array to provide adequate performance against fast fading.

48. The antenna array system according to claim 30 further comprising a Butler matrix for performing an approximation of a Fourier transform or an inverse Fourier transform on a transmit signal traversing through the Butler matrix to the first array in the transmit mode.

49. The antenna array system according to claim 30 further comprising:

an amplifier system containing different amplifiers for amplifying a transmit signal for the first array in the transmit mode;

a pair of Butler matrices coupled to the amplifier system for load-sharing among the different amplifiers.

50. The antenna array system according to claim 30 wherein the controller provides the control signal for digitally controlling the first array at baseband to tailor downlink transmission of a signal to a mobile station based on reception from the mobile station received at least at the first array.

51. The antenna array system according to claim 30, wherein the coverage pattern of the first and second array of antenna elements are same.

52. The antenna array system according to claim 30, wherein the second array of antenna elements operate only in the receive mode.

* * * * *